UNITED STATES PATENT OFFICE.

FRANÇOIS COIGNET, OF PARIS, FRANCE, ASSIGNOR TO COIGNET AGGLOMERATE COMPANY OF THE UNITED STATES, OF NEW YORK CITY.

IMPROVEMENT IN THE MANUFACTURE OF ARTIFICIAL STONE.

Specification forming part of Letters Patent No. 99,062, dated January 25, 1870.

*To all whom it may concern:*

Be it known that I, FRANÇOIS COIGNET, of the city of Paris, in the department of la Seine, and Empire of France, have invented certain Improvements in Artificial Stones and Monolithic Structures; and I do hereby declare that the following is a full and exact description thereof, which will enable others skilled in the art to make and use the same.

The use of fat-lime concretes for the erection of buildings, bridges, dams, &c., is very limited, because, by all the known processes of manipulation of the said fat lime, the setting of such concretes is generally so slow as to require weeks, months, and, in some cases, years, before they acquire the desired strength for resisting the influences of the elements.

It is true that of late it was hoped that, by substituting hydraulic cements for fat lime, a concrete would be obtained which would answer for building above ground; but the results, in practice, have not answered these expectations.

These hydraulic-cement concretes, if made by the ordinary methods, do not resist the changes of temperature, cracking in the air, and becoming spongy. They are also more expensive, and their manipulation requires a strict and constant watching.

The object of my present invention is to point out a sure and reliable mode of obtaining always, in a practical manner, with ordinary or fat lime and sand, or sand and gravel, a good concrete, which may be used for all purposes of construction, either as artificial stone or for monolithic structures, as well in elevation as for under-ground works. This result cannot be obtained without bringing all the molecules of the concrete in closer proximity than they can be brought by the ordinary processes now employed; and I have found that the only practical mode of obtaining a good result was by the following process:

The proportion of fat lime and sand I employ is to be varied according to the object in view, and of the quality of the lime or sand which is at hand; and in this particular it is much the same as in the confection of ordinary concretes, but the amount of water is of a capital and all-important consequence. It has to be just enough for properly slaking the lime and furnishing the due amount of dampness for the crystallizing of the lime, and as this varies with the specimens of lime employed, nothing but practice can point out the exact amount of water to be used. The materials—sand, lime, and water—are now to be triturated energetically in a mill, which will act by compression, friction, and agitation, and the material, to be ready for use, must present the peculiar appearance of pasty powder so characteristic in my process of manipulation. This pasty powder is now agglomerated in molds or in spaces where it is required to be used by successive layers, systematically pounded all over by the repeated action of a flat-ended rammer; and no one layer is laid over the previous one until said layer or shatterer has been perfectly packed and agglomerated.

This mode of packing the granulated concrete paste in successive thin layers, and of applying thereto, all over the surface thereof, the pounding action of a rammer, so as to exert, on every particle of material and through the whole mass, a heavy and resistless pressure, is what I call my process of agglomerating; and it is, in a great measure, this process to which is due the hardness of my stones.

By this combination of processes I obtain a stone or masonry setting quickly, and presenting, after due exposure to the influence of the elements, the marble-like character so desirable in artificial stones, which cannot be obtained with fat lime and sand by any other known processes of manipulation.

When, for some purpose, I desire to obtain a quicker setting of my stones or masonry, I employ a small quantity of good hydraulic cement in combination with the lime; but in many cases I only use the fat lime.

What I claim as my invention, and desire to secure by Letters Patent of the United States, is—

The process or combination of the several physico-chemico mechanical means, above described, of employing fat lime or common lime in artificial stones or monolithic structures, substantially in the manner and for the purpose set forth.

FRANÇOIS COIGNET.

Witnesses:
GUIDO BARRAULT,
AUNEIL.